United States Patent
Wang et al.

(10) Patent No.: US 11,584,184 B2
(45) Date of Patent: Feb. 21, 2023

(54) CONTROL METHOD FOR HYBRID ELECTROMAGNETIC SUSPENSION

(71) Applicant: Jiangsu University, Zhenjiang (CN)

(72) Inventors: Ruochen Wang, Zhenjiang (CN); Yuchen Qian, Zhenjiang (CN); Xiangpeng Meng, Zhenjiang (CN); Zeyu Sun, Zhenjiang (CN); Jian Xie, Zhenjiang (CN); Long Chen, Zhenjiang (CN)

(73) Assignee: Jiangsu University, Zhenjiang (CN)

( * ) Notice: Subject to any disclaimer, the term of this patent is extended or adjusted under 35 U.S.C. 154(b) by 763 days.

(21) Appl. No.: 16/491,879

(22) PCT Filed: Sep. 1, 2017

(86) PCT No.: PCT/CN2017/100109
§ 371 (c)(1),
(2) Date: Sep. 6, 2019

(87) PCT Pub. No.: WO2019/024164
PCT Pub. Date: Feb. 7, 2019

(65) Prior Publication Data
US 2020/0031188 A1 Jan. 30, 2020

(30) Foreign Application Priority Data
Jul. 31, 2017 (CN) .......................... 20170637762.6

(51) Int. Cl.
*B60G 17/018* (2006.01)
*B60G 17/0195* (2006.01)
(52) U.S. Cl.
CPC ....... *B60G 17/018* (2013.01); *B60G 17/0195* (2013.01); *B60G 2400/60* (2013.01)
(58) Field of Classification Search
None
See application file for complete search history.

(56) References Cited

U.S. PATENT DOCUMENTS

| 2010/0106368 A1* | 4/2010 | Hidaka | B60G 17/08 701/38 |
| 2014/0265170 A1* | 9/2014 | Giovanardi | F15B 13/0444 280/5.5 |
| 2017/0100980 A1* | 4/2017 | Tsuda | B60G 17/0165 |

FOREIGN PATENT DOCUMENTS

| CN | 105480043 A | 4/2016 |
| CN | 105751845 A | 7/2016 |

(Continued)

OTHER PUBLICATIONS

Wang, Ruochen et al., "Design and Experiment on Semi-active Controller for Hybrid Suspension", Transactions of the Chinese Society for Agricultural Machinery, 48(6), Jun. 30, 2017, pp. 334-338.

(Continued)

*Primary Examiner* — Lail A Kleinman
(74) *Attorney, Agent, or Firm* — Greenberg Traurig, LLP

(57) ABSTRACT

A control method for hybrid electromagnetic suspension. The method provides four modes for hybrid electromagnetic suspension: a comfort mode, a sport mode, a combined mode, and an energy feedback mode. A driver can switch between the four modes as desired. For the comfort, sport, and combined modes, hybrid control is adopted, and two sub-modes are provided: an active control mode and a semi-active control mode. A switching condition between the two sub-modes is determined by using a novel parameter $C_{act}$ and comparing the same against a maximum equivalent electromagnetic damping coefficient $C_{eqmax}$ of a linear motor. The present invention solves the problem of achieving a balance between suspension comfort and tire traction, and meets the demands of different operating conditions and users by enabling manual mode switching. In addition, the hybrid control is employed to solve the problems of high energy consumption of active suspension and limited control (Continued)

performance of semi-active suspension, thus ensuring good kinematic performance of automobile suspension while reducing energy consumption. Furthermore, the energy feedback mode is designed to enable the suspension to perform energy recovery, meeting demands of energy conservation and emission reduction.

9 Claims, 5 Drawing Sheets

(56) References Cited

FOREIGN PATENT DOCUMENTS

| | | |
|---|---|---|
| EP | 2799263 A1 | 11/2014 |
| GN | 104309438 A | 1/2015 |
| WO | 03035417 A1 | 5/2003 |

OTHER PUBLICATIONS

Wang, JiaJia et al., "Optimization Design of Damping Coefficient Used in Hybrid Electromagnetic Suspension Systems", Chinese Journal of Automotive Engineering, 7(2), Mar. 31, 2017, pp. 93-98.
International Search Report from PCT Application PCT/CN2017/100109, dated Apr. 27, 2018, six (6) pages.

* cited by examiner

CONTROL METHOD FOR HYBRID ELECTROMAGNETIC SUSPENSION

CROSS REFERENCE TO RELATED APPLICATION

The present application is a 371 U.S. National Stage of International Application No. PCT/CN2017/100109, filed Sep. 1, 2017, which claims the benefit of the earlier filing date of Chinese Patent Application No. 201710637762.6 filed on Jul. 31, 2017, which are each incorporated herein by reference in their entirety.

TECHNICAL FIELD

The present invention relates to the field of automotive chassis control, in particular to a control method of electromagnetic hybrid suspension.

BACKGROUND ART

The demand and ownership of automobiles in China are constantly increasing, and energy shortage and environmental problems resulted from that are becoming increasingly prominent. Energy conservation and emission reduction have become one of the themes of automobile development. There is a large amount of energy loss in the process of driving, in which vibration energy loss is transformed into heat energy loss through dampers, accounting for about 20% of all energy loss.

The electromagnetic hybrid suspension can improve the fuel economy of the automobile by recovering part of the vibration energy by the linear motor, and can also improve the dynamic performance of the automotive suspension by the active output control force of the linear motor. In active control of electromagnetic hybrid suspension, the suspension will consume energy, and the vibration isolation of suspension has a contradictory relationship with the road holding of the tire.

Therefore, it is of great research value to design appropriate control strategies to switch the energy-feeding mode and dynamic performance mode of electromagnetic hybrid suspension and coordinate the characteristics of energy consumption, vibration isolation and tire road holding of suspension in active mode.

CONTENTS OF THE INVENTION

The technical problems to be solved by the present invention is to design a control method of electromagnetic hybrid suspension, which can switch the energy-feeding mode and dynamic performance mode of electromagnetic hybrid suspension, coordinate and control the characteristics of energy consumption, vibration isolation and tire road holding of suspension when the suspension is in dynamic performance mode.

The technical solution adopted by the present invention to solve the technical problem is as follows:

A control method of electromagnetic hybrid suspension is realized by the following steps:

A: a quarter electromagnetic hybrid suspension system model is established. The linear mathematical model can be expressed by dynamic differential equation:

$$\begin{cases} \ddot{Z}_b m_b = -k_t(Z_b - Z_w) - C_s(\dot{Z}_b - \dot{Z}_w) + F_{act} \\ \ddot{Z}_w m_w = k_s(Z_b - Z_w) + C_s(\dot{Z}_b - \dot{Z}_w) - k_t(Z_w - Z_b) - F_{act} \end{cases} \quad (1)$$

In the formula, $m_b$ is spring-loaded mass, $m_w$ is non-spring-loaded mass, $k_s$ is spring stiffness, $C_s$ is passive adjustable damper damping coefficient, $k_t$ is tire equivalent stiffness, $Z_0$ is road input displacement, and the mathematical model can be expressed as:

$$\dot{Z}_0(t) = -2pf_0 Z_0(t) + 2p\sqrt{G_0} u w(t) \quad (2)$$

In the formula, $G_0$ is the road roughness, P is π, u is the vehicle speed, $f_0$ is the lower cut-off frequency, w(t) is the Gauss white noise and the mean value is 0, which is used to generate random road surface. In the present invention, the pavement grade is set to C, road roughness $G_0$ is $256 \cdot 10^{-6}$ m³, and vehicle speed is set to 20 m/s, B: the electromagnetic hybrid suspension is divided into four working modes: comfort mode, sport mode, comprehensive mode and energy-feeding mode. The switch between the four modes is switched artificially. When the electromagnetic hybrid suspension is in comfort mode, the root mean square (RMS) value of vehicle body acceleration is the main improvement target of the suspension; in sport mode, the RMS value of tire dynamic load is taken as the main improvement target of suspension; in the comprehensive mode, the suspension is required to take into account the RMS values of the vehicle body acceleration and tire dynamic load; in the energy-feeding mode, the suspension is required to maximize the energy-feeding on the premise of guaranteeing the basic dynamic performance.

C: when the electromagnetic hybrid suspension is in comfort mode, sport mode and comprehensive mode, it can be divided into two sub-modes: active control mode and semi-active control mode.

In active control mode, ECU calculates the required control force $F_{des}$ through control strategy, then divide it by the thrust coefficient $K_f$ of the motor to get the current $I_{des}$ needed by the linear motor. Thereafter, the current $I_{des}$ is input to the linear motor controller. On-board power supply is connected with linear motor controller, and linear motor controller is connected with linear motor. Finally, input current I to linear motor, linear motor outputs active control force $F_{act}$ to suspension. At this time, suspension consumes energy;

In semi-active control mode, ECU calculates the required control force $F_{des}$ through control strategy, then divide it by the thrust coefficient $K_f$ of the motor to get the current $I_{des}$ needed by the linear motor. Thereafter, the current $I_{des}$ is input to the semi-active loop controller. The semi-active loop controller is connected with the semi-active control loop. The duty cycle is input to the semi-active control loop to adjust the current I in the semi-active control loop, thereby adjusting the equivalent damping coefficient $C_{eq}$ of the linear motor. Semi-active control loop is connected with linear motor. Linear motor outputs electromagnetic damping force to suspension system. Linear motors are used as electromagnetic dampers (i.e. generators), and the electric energy recovered by the linear motor as a generator is stored in super capacitors. Introducing parameters:

$$C_{act} = -\frac{F_{des}}{v_{rel}} \quad (3)$$

In the formula, $F_{des}$ represents the control force required to be supplied by the linear motor and calculated by the control strategy. Comparing $C_{act}$ with the maximum equivalent damping coefficient $C_{eqmax}$ of linear motor, if $0 < C_{act} < C_{eqmax}$, it is in semi-active control mode, and other cases are in active control mode.

D: when the electromagnetic hybrid suspension is in the energy-feeding mode, the linear motor acts as a generator, which is equivalent to an non-adjustable electromagnetic damper acting in the suspension, and the electromagnetic damping coefficient is the maximum equivalent electromagnetic damping coefficient $C_{eqmax}$, to ensure that as much electric energy as possible can be recovered, the electric energy is stored in super capacitors.

Further, the control force $F_{des}$ required to be supplied by the linear motor in step C is calculated from the LQG control strategy, changing the selection of LQG weighting coefficients to make it correspond to the comfort mode, sport mode and comprehensive mode respectively. The LQG performance index function is designed as follows:

$$J = \lim_{T \to \infty} \frac{1}{T} \int_0^T [q_1(Z_w - Z_0)^2 + q_2(Z_b - Z_w)^2 + q_3 \ddot{Z}_b^2] dt \tag{4}$$

In the formula, $Z_w - Z_0$ is the dynamic displacement of the tire, multiplying it by the equivalent stiffness $k_t$ of the tire is the dynamic load of the tire. $Z_b - Z_w$ is the suspension dynamic travel. $\ddot{Z}_b$ is the acceleration of the vehicle body, therefore, $q_1$, $q_2$ and $q_3$ represent the weighting coefficients of tire dynamic load, suspension dynamic travel and vehicle body acceleration, respectively.

The state space equation of electromagnetic hybrid suspension is as follows:

$$\dot{X} = AX + BU \tag{5}$$

In the formula, selecting $X = [\dot{Z}_b\ \dot{Z}_w\ Z_b\ Z_w\ Z_0]^T$ as the state variable, $U = [F_{act}]$ as the input control variables, the following can be obtained:

$$A = \begin{bmatrix} -\frac{C_s}{m_b} & \frac{C_s}{m_b} & -\frac{k_s}{m_b} & \frac{k_s}{m_b} & 0 \\ \frac{C_s}{m_w} & -\frac{C_s}{m_w} & \frac{k_s}{m_w} & -\frac{k_s + k_t}{m_w} & \frac{k_t}{m_w} \\ 1 & 0 & 0 & 0 & 0 \\ 0 & 1 & 0 & 0 & 0 \end{bmatrix}$$

$$B = \begin{bmatrix} \frac{1}{m_b} & -\frac{1}{m_w} & 0 & 0 \end{bmatrix}^T$$

Selecting $Y = [Z_w - Z_0\ Z_b - Z_w\ \ddot{Z}_b]^T$ as the output control variables, the output equation is as follows:

$$Y = CX + DU \tag{6}$$

$$C = \begin{bmatrix} 0 & 0 & 0 & 1 & -1 \\ 0 & 0 & 1 & -1 & 0 \\ -\frac{C_s}{m_b} & \frac{C_s}{m_b} & -\frac{k_s}{m_b} & \frac{k_s}{m_b} & 0 \end{bmatrix}$$

$$D = \begin{bmatrix} 0 & 0 & \frac{1}{m_b} \end{bmatrix}^T$$

For LQG control algorithm, the objective is to obtain the input control variables $U = [F_{act}]$, so that the performance index function obtains the minimum value. It belongs to one of the quadratic optimal control problems, so the performance index function is written in the standard quadratic form as follows:

$$J = \lim_{T \to \infty} \frac{1}{T} \int_0^T (X^T Q X + U^T R U + 2X^T N U) dt \tag{7}$$

It can be obtained from formula (4) and formula (6):

$$J = \lim_{T \to \infty} \frac{1}{T} \int_0^T Y^T Q_0 Y\, dt \tag{8}$$

In the formula, $Q_0$ is LQG weighted coefficient matrix, which is expressed as follows:

$$Q_0 = \begin{bmatrix} q_1 & 0 & 0 \\ 0 & q_2 & 0 \\ 0 & 0 & q_3 \end{bmatrix}$$

Therefore, the weighted matrix Q of the state variable, the weighted matrix R of the control variable and the weighted matrix N of the crossover term can be obtained:

$$Q = C^T Q_0 C$$

$$= \begin{bmatrix} \frac{C_s^2}{m_b^2}q_3 & -\frac{C_s^2}{m_b^2}q_3 & \frac{C_s k_s}{m_b^2}q_3 & -\frac{C_s k_s}{m_b^2}q_3 & 0 \\ -\frac{C_s^2}{m_b^2}q_3 & \frac{C_s^2}{m_b^2}q_3 & -\frac{C_s k_s}{m_b^2}q_3 & \frac{C_s k_s}{m_b^2}q_3 & 0 \\ \frac{C_s k_s}{m_b^2}q_3 & -\frac{C_s k_s}{m_b^2}q_3 & q_2 + \frac{k_s^2}{m_b^2}q_3 & -q_2 + \frac{k_s^2}{m_b^2}q_3 & 0 \\ -\frac{C_s k_s}{m_b^2}q_3 & \frac{C_s k_s}{m_b^2}q_3 & -q_2 + \frac{k_s^2}{m_b^2}q_3 & q_1 + q_2 + \frac{k_s^2}{m_b^2}q_3 & -q_1 \\ 0 & 0 & 0 & -q_1 & q_1 \end{bmatrix}$$

$$R = D^T Q_0 D = \frac{q_3}{m_b^2}$$

$$N = C^T Q_0 D$$
$$= D^T Q_0 C$$
$$= \begin{bmatrix} -\frac{C_s}{m_b^2}q_3 & \frac{C_s}{m_b^2}q_3 & -\frac{k_s}{m_b^2}q_3 & \frac{k_s}{m_b^2}q_3 & 0 \end{bmatrix}^T$$

It can be concluded that the size of the state variable matrix Q is related to the values of $q_1$, $q_2$ and $q_3$, so the weighting coefficient plays a decisive role in the control effect of the LQG control strategy.

To obtain the optimal control force $F_{act}$ of LQG control strategy, it is required to obtain the feedback state gain matrix K, namely:

$$F_{act} = -KX \tag{9}$$

It can also be expressed as:

$$F_{act} = -(k_1 \dot{Z}_b + k_2 \dot{Z}_w + k_3 Z_b + k_4 Z_w + k_5 Z_0) \tag{10}$$

According to LQG control theory, gain matrix K can be expressed as:

$$K = R^{-1}(SB + N)^T \tag{11}$$

Wherein, matrix S is the solution of Ricatti equation. The form of Ricatti equation is as follows:

$$(SA)^T + SA - (SB + N)R^{-1}(SB + N)^T + Q = 0 \tag{12}$$

In the software Matlab, matrix K, S can be obtained by using its own LQR function:

$$[K\ S\ E]=lqr(A,B,Q,R,N) \qquad (13)$$

Further, the three state variables of vehicle body acceleration, tire dynamic load and suspension dynamic travel are collected and input into LQG controller. There are different combinations of LQG weighting coefficients under different mixing modes. LQG controller calculates F des based on state variables and weighting coefficients.

Further, weighting coefficients of LQG control strategy are optimized by genetic algorithm. The optimization objectives of genetic algorithm are vehicle body acceleration and tire dynamic load, which represent vibration isolation of vehicle and tire road holding. The performance parameter of suspension dynamic travel is used as the constraints of the optimization algorithm. The optimized design variable is LQG weighting coefficient:

$$x=(q_1\ q_2\ q_3)^T \qquad (14)$$

In the process of optimizing LQG weighting coefficients by genetic algorithm, the fitness function needs to be calculated by the objective function. The LQG control strategy of electromagnetic hybrid suspension has three modes: comfort, sport and comprehensive, in which comfort mode requires minimum vehicle body acceleration, sport mode requires minimum tire dynamic load, and comprehensive mode requires both. Therefore, the calculation methods of fitness function are different when genetic algorithm optimization is carried out under three modes.

In comfort mode, the objective function is the RMS value of vehicle body acceleration. Since the root mean square of vehicle body acceleration is required to take the minimum value, while the fitness function should be proportional to the genetic probability and be required to take the maximum value, therefore, the fitness function is designed as follows:

$$F(x) = \begin{cases} A_P - A_H, & \text{if } A_H < A_P \\ 0, & \text{if } A_H \geq A_P \end{cases} \qquad (15)$$

In the formula, $A_P$ is the RMS value of vehicle body acceleration of traditional passive suspension under the same simulation conditions. $A_H$ is the RMS value of vehicle body acceleration of electromagnetic hybrid suspension under LQG control strategy.

In the sport mode, the fitness function is designed as follows:

$$F(x) = \begin{cases} T_P - T_H, & \text{if } T_H < T_P \\ 0, & \text{if } T_H \geq T_P \end{cases} \qquad (16)$$

In the formula, $T_P$ is the RMS value of tire dynamic load of traditional passive suspension under the same simulation conditions. $T_H$ is the RMS value of tire dynamic load of electromagnetic hybrid suspension under LQG control strategy.

In the comprehensive mode, the objective functions are the RMS value of vehicle body acceleration and the RMS value of tire dynamic load, so it belongs to multi-objective genetic algorithm optimization, and the fitness function is designed as follows:

$$F(x) = \frac{A_P}{A_H} + \frac{T_P}{T_H} \qquad (17)$$

The specific steps are as follows:

(1) Parameter initialization: $q_1$, $q_2$ and $q_3$ are encoded by binary system respectively, and then they are connected in series to form a chromosome string to form an individual. When decoding, the binary code is converted to decimal value, then the suspension system is controlled.

(2) Generating population: the initial population with population size of M=80 is generated by random method, while the new population is generated by genetic operator operation on the previous generation population.

(3) Fitness function evaluation: the objective functions $A_H$ and $T_H$ of the suspension system controlled by the decoded weighting coefficients are extracted and then transformed into fitness function F(x).

(4) Selection operation: using proportional selection method, assuming that the fitness of the $i^{th}$ individual is F(i), then the genetic probability $p_{si}$ is:

$$p_{si} = F(i) \bigg/ \sum_{i=1}^{M} F(i) \quad i = 1, 2, \cdots, M \qquad (18)$$

(5) Cross operation: single point crossover is adopted. Select a single crossover point for each pair of the paired individuals according to the crossover probability $p_c=0.6$ and exchange some of their chromosomes.

(6) Mutation operation: basic bit mutation is used. According to the mutation probability $p_m=0.001$, a part of the gene value in the coding string of an individual chromosome is inversely calculated.

(7) Termination condition judgment: the termination algebra T=300 is set, and the optimal individual in the $300^{th}$ evolutionary algebraic population is output as the optimal solution. If the average fitness difference of 15 successive generations is less than 0.5%, the operation will be terminated ahead of time, and the optimal individual in the current population will be output as the optimal solution.

Further, the circuit switching between the active control mode and the semi-active control mode in step C is realized by the switching device IGBT: the on-board power supply is connected with the inverter, and the other end of the inverter is connected with the switching device VT1. The other end of the switching device VT1 connects the switching device VT2 and the linear motor M. The switching device VT2 is connected with a rectifier bridge and a DC/DC converter. The output of the DC/DC converter is connected with the positive end of the diode and the negative end of the diode is connected with the super capacitor SC.

Further, the control circuit structure used in the energy-feeding mode in step D is designed as follows: the linear motor M is connected with the rectifier bridge, and one end of the rectifier bridge is connected with one end of an inductance L. The other end of the inductance L is connected with one end of a switch S1 and one end of a switch S2 respectively. The other end of the switch S2 is connected with the positive end of the diode, and the negative end of the diode is connected with one end of the super capacitor SC. The other end of the super capacitor SC is connected with the other end of the switch S1 and the other end of the rectifier bridge respectively.

Further, the adjustable dampers correspond to four different gears, which correspond to the comfort mode, sport mode, comprehensive mode and energy feeding mode, respectively.

The technology has the following advantages:

(1) The electromagnetic hybrid suspension is divided into four modes: comfort mode, sport mode, comprehensive mode and energy feedback mode, which can meet the needs of automobiles under different working conditions, and can be switched artificially to meet the needs of users.

(2) There are two sub-modes in comfort mode, sport mode and comprehensive mode: active control mode and semi-active control mode, and the switch conditions of the two modes are designed. This method can combine the excellent control effect of active control and low energy consumption of semi-active control, and can take into account the dynamic performance and energy consumption characteristics of suspension.

(3) In the energy feeding mode, the suspension can recover energy, and at this time the suspension operates as the traditional passive suspension. It can not only ensure the basic suspension function, but also meet the requirements of energy saving and emission reduction.

DETAILED DESCRIPTION OF THE PREFERRED EMBODIMENTS

The present invention is further described in connection with the drawings and examples.

Figure 1:
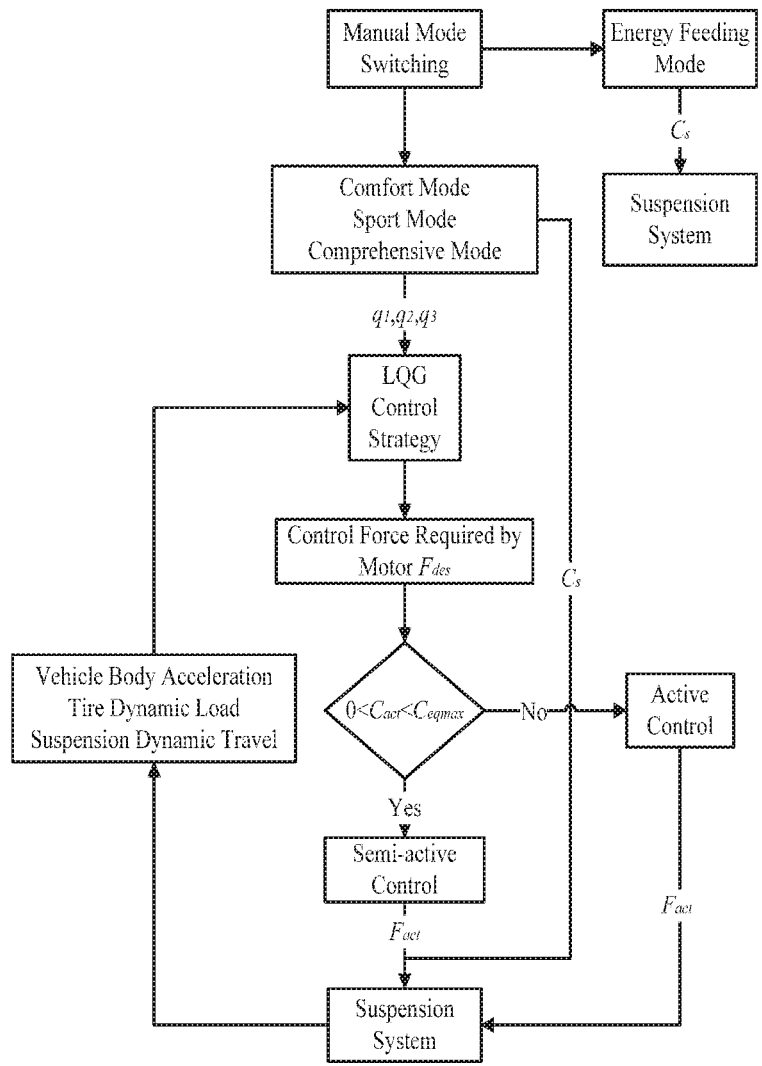
FIG. 1 is an overall flowchart of the present invention.

An overall flowchart of a control method of the electromagnetic hybrid suspension of the present invention is shown in FIG. 1.

First, a quarter electromagnetic hybrid suspension system model is established. The linear mathematical model can be expressed by dynamic differential equation:

$$\begin{cases} \ddot{Z}_b m_b = -k_s(Z_b - Z_w) - C_s(\dot{Z}_b - \dot{Z}_w) + F_{act} \\ \ddot{Z}_w m_w = k_s(Z_b - Z_w) + C_s(\dot{Z}_b - \dot{Z}_w) - k_t(Z_w - Z_0) - F_{act} \end{cases} \quad (1)$$

In the formula, $m_b$ is spring-loaded mass, $m_w$ is non-spring-loaded mass, $k_s$ is spring stiffness, $C_s$ is passive adjustable damper damping coefficient, $k_t$ is tire equivalent stiffness, $Z_0$ is road input displacement, and the mathematical model can be expressed as:

$$\dot{Z}_0(t) = -2pf_0 Z_0(t) + 2p\sqrt{G_0 u} w(t) \quad (2)$$

In the formula, $G_0$ is the road roughness, u is the vehicle speed, $f_0$ is the lower cut-off frequency, w(t) is the Gauss white noise and the mean value is 0, which is used to generate random road surface. In the present invention, the pavement grade is set to C, road roughness $G_0$ is $256 \cdot 10^{-6}$ m$^3$, and the vehicle speed is set to 20 m/s.

In the present invention, electromagnetic hybrid suspension can be divided into four modes: comfort mode, sport mode, comprehensive mode and energy-feeding mode. The switch between the four modes is decided by the driver. In each mode, the damping coefficient of the adjustable damper is different. The adjustable damper is designed to be adjustable among four gears. When the driver switches modes, the controller controls the stepping motor to adjust the throttle size of the damper, thereby adjusting the damping coefficient $C_s$ of the damper.

When the electromagnetic hybrid suspension is in comfort mode, sport mode and comprehensive mode, the suspension is controlled by LQG control strategy. The LQG performance index function is designed as follows:

$$J = \lim_{T \to \infty} \frac{1}{T} \int_0^T \left[ q_1(Z_w - Z_0)^2 + q_2(Z_b - Z_w)^2 + q_3 \ddot{Z}_b^2 \right] dt \quad (3)$$

Figure 2:
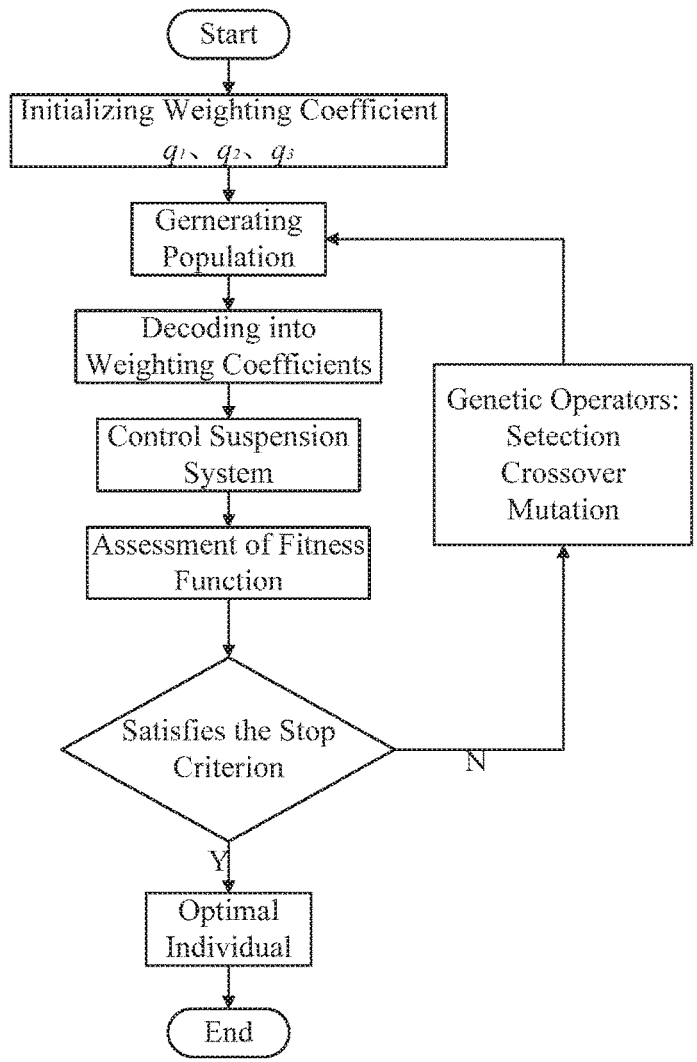
FIG. 2 is a flowchart of genetic algorithm optimization.

In the formula, $q_1$, $q_2$ and $q_3$ represent the weighting coefficients of tire dynamic load, suspension dynamic travel and vehicle body acceleration, respectively. Different weighting coefficients have different effects on suspension dynamic performance. The requirements of the present invention are as follows: the improvement of vehicle body acceleration is emphasized in comfort mode, the improvement of tire dynamic load is emphasized in sport mode, the consideration of vehicle body acceleration and tire dynamic load is given in comprehensive mode, and the index of the suspension dynamic travel plays a limiting role. The genetic algorithm is used for optimization, and the optimization objectives are the vehicle body acceleration and tire dynamic load, and the suspension dynamic travel is taken as the optimum constraint condition. The optimization process is shown in FIG. 2. The weighting coefficients of the three modes after optimization are as follows:

| Working mode | $q_1$ | $q_2$ | $q_3$ |
| --- | --- | --- | --- |
| Comfort mode | 30146 | 4838 | 4.85 |
| Sport mode | 920358 | 65037 | 0.93 |
| Comprehensive mode | 41369 | 4603 | 1.08 |

Because the active control of suspension has the disadvantage of high energy consumption and the semi-active control has the disadvantage of limited control effect, the present invention proposes a hybrid control method, which designs two sub-modes: active control mode and semi-active control mode when the electromagnetic hybrid suspension is in comfort mode, sport mode and comprehensive mode.

Figure 3:
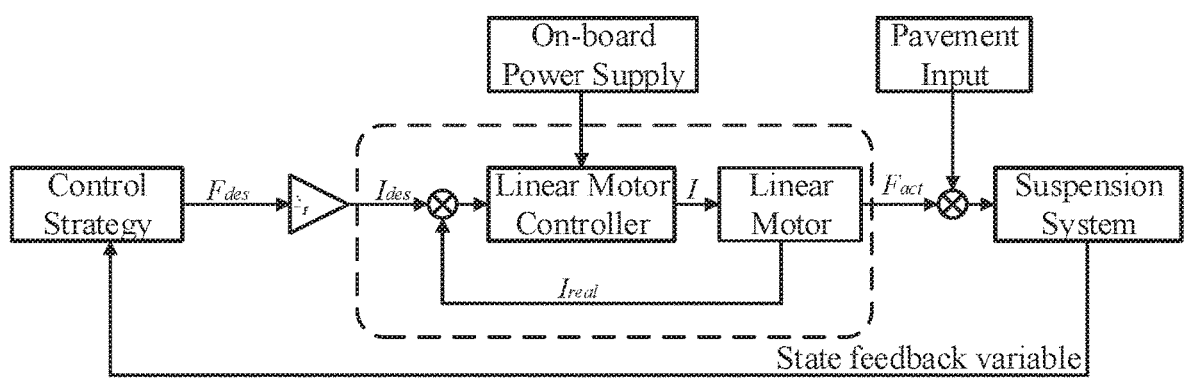
FIG. 3 is a block diagram of the active control sub-mode system.

In the active control mode, on-board power supply powers the linear motor and actively output the control force, which actually controls the input current I of the linear motor, the double-loop control system is designed in the present invention, as shown in FIG. 3. The state feedback variables measured in the suspension system are input to the external controller. The control force $F_{des}$ required to be provided by the motor is calculated by the controller, and the required current $I_{des}$ is input to the inner loop control. The inner loop control is the current tracking control, which enables the input current I of the linear motor to track the required current $I_{des}$, thereby outputting the control force $F_{act}$. External energy comes from direct power supply of on-board power supply.

Figure 4:
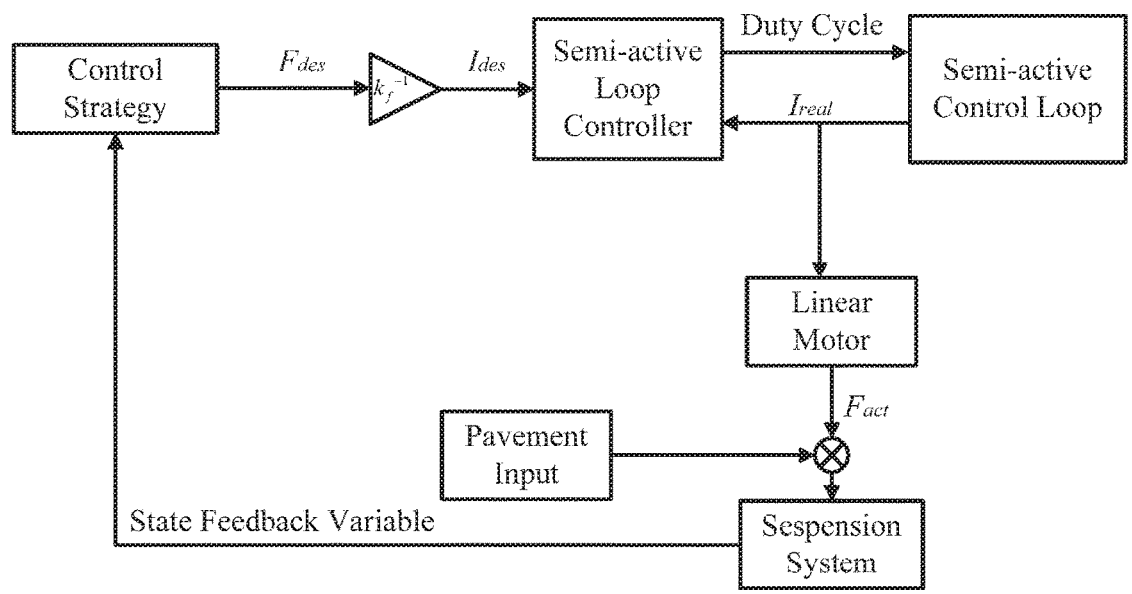
FIG. 4 is a block diagram of the semi-active control sub-mode system.
Figure 5:
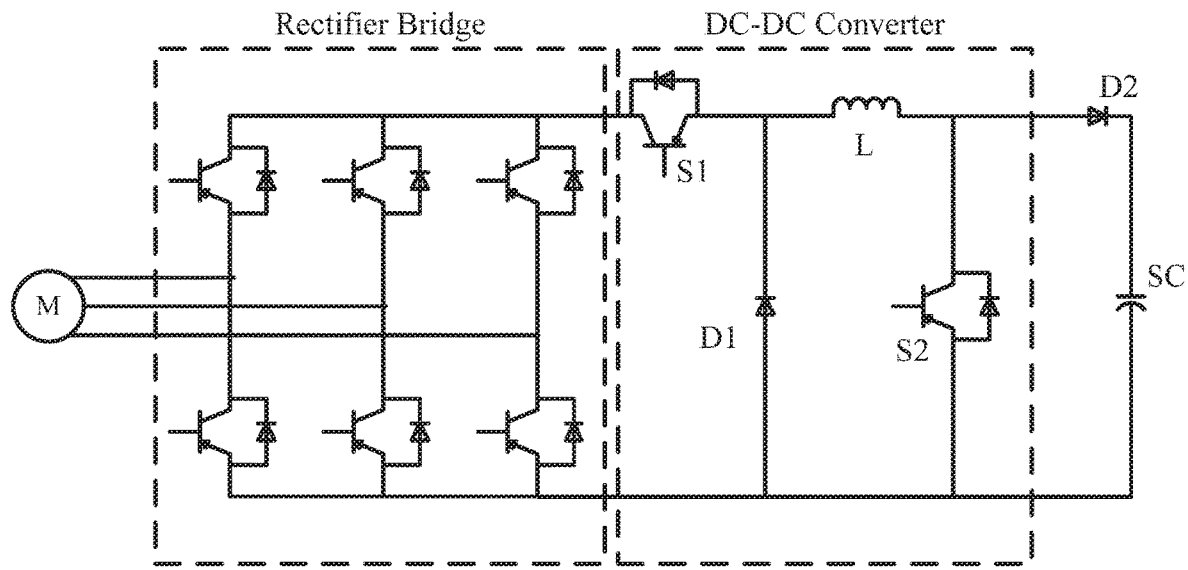
FIG. 5 is a topological graph of the semi-active control loop.

The control system in semi-active control mode is shown in FIG. 4. According to the feedback state variables in the suspension system, the required equivalent electromagnetic damping force $F_{des}$ is calculated, and the required current $I_{des}$ in the winding of linear motor at this time is calculated. The semi-active loop controller adjusts the duty cycle in the semi-active control loop so that the actual current in the winding of the linear motor $I_{real}$ tracks $I_{des}$, so that the equivalent electromagnetic damping force $F_{act}$ provided by the linear motor tracks $F_{des}$. FIG. 5 shows the topological structure of the semi-active control loop. The linear motor M is connected with the rectifier bridge, and the rectifier bridge is connected with the drain of the switch S1. The source of switch S1 is connected to the inductance L and the negative end of the diode D1 respectively. The other end of the inductance L is connected with the drain of the switch S2 and the positive end of the diode D2, and the negative end of the diode D2 is connected with the supercapacitor SC. The other end of the supercapacitor SC is connected with the positive end of the diode D1 and the source of the switch S2. When the terminal voltage of linear motor is less than that of supercapacitor, S1 switches on and S2 switches off, which makes the circuit generate current and avoids dead-zone phenomenon. In other cases, S1 switches off, S2 switches on, and electric energy is stored in the supercapacitor. The upward and downward movement of suspension will make the direction of current in the linear motor change constantly, so it is necessary to add the rectifier bridge in the loop to ensure the consistency of current direction. DC-DC converter plays the role of boosting and lowering voltage. After calculation, the semi-active loop controller outputs two pulse signals to S1 and S2 to adjust duty cycle. In semi-active control, the electric energy generated by linear motor can be stored in the supercapacitor through the semi-active control loop to recover energy.

Introducing parameters:

$$C_{act} = -\frac{F_{des}}{v_{rel}} \tag{4}$$

Figure 6:
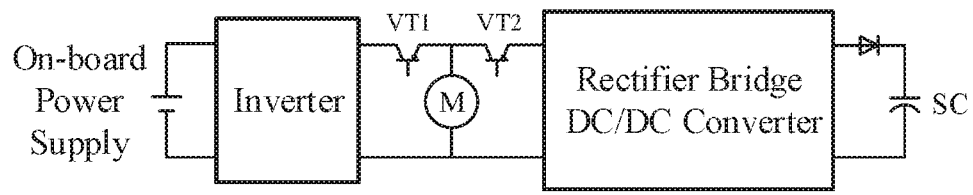
FIG. 6 is a block diagram of the switching circuit.

In the formula, $F_{des}$ represents the control force required to be provided by the linear motor and calculated by the control strategy. Comparing $C_{act}$ with the maximum equivalent damping coefficient $C_{eqmax}$ of linear motor, if $0 < C_{act} < C_{eqmax}$, it is in semi-active control mode, and other cases are in active control mode. Switching between the two sub-modes is realized by switching device IGBT. The frequency of switching devices is much higher than that of suspension vibration, as shown in FIG. 6.

The specific process of $F_{des}$ calculation by LQG control strategy is as follows:

The state space equation of electromagnetic hybrid suspension is as follows:

$$\dot{X} = AX + BU \tag{5}$$

Select $X = [\dot{Z}_b\ \dot{Z}_w\ Z_b\ Z_w\ Z_0]^T$ as the state variable, $U = [F_{act}]$ as the input control variables, the following can be obtained:

$$A = \begin{bmatrix} -\frac{C_s}{m_b} & \frac{C_s}{m_b} & -\frac{k_s}{m_b} & \frac{k_s}{m_b} & 0 \\ \frac{C_s}{m_b} & -\frac{C_s}{m_b} & \frac{k_s}{m_w} & -\frac{k_s + k_t}{m_w} & \frac{k_t}{m_w} \\ 1 & 0 & 0 & 0 & 0 \\ 0 & 1 & 0 & 0 & 0 \end{bmatrix}$$

$$B = \begin{bmatrix} \frac{1}{m_b} & -\frac{1}{m_w} & 0 & 0 \end{bmatrix}^T$$

Select $Y = [Z_w - Z_0\ Z_b - Z_w\ \ddot{Z}_b]^T$ as the output control variables, the output equation is as follows:

$$Y = CX + DU \tag{6}$$

$$C = \begin{bmatrix} 0 & 0 & 0 & 1 & -1 \\ 0 & 0 & 1 & -1 & 0 \\ -\frac{C_s}{m_b} & \frac{C_s}{m_b} & -\frac{k_s}{m_b} & \frac{k_s}{m_b} & 0 \end{bmatrix}$$

$$D = \begin{bmatrix} 0 & 0 & \frac{1}{m_b} \end{bmatrix}^T$$

For LQG control algorithm, the objective is to obtain the input control variables $U = [F_{act}]$ and make the performance index function take the minimum value. It belongs to one of the quadratic optimal control problems, so the performance index function is written in the standard quadratic form as follows:

$$J = \lim_{T \to \infty} \frac{1}{T} \int_0^T (X^T Q X + U^T R U + 2 X^T N U) dt \tag{7}$$

It can be obtained from formula (4) and formula (6):

$$J = \lim_{T \to \infty} \frac{1}{T} \int_0^T Y^T Q_0 Y\, dt \tag{8}$$

In the formula, $Q_0$ is LQG weighting coefficient matrix, which is expressed as follows:

$$Q_0 = \begin{bmatrix} q_1 & 0 & 0 \\ 0 & q_2 & 0 \\ 0 & 0 & q_3 \end{bmatrix}$$

Therefore, the weighting matrix Q of the state variable, the weighting matrix R of the control variable and the weighting matrix N of the crossover term can be obtained:

$$Q = C^T Q_0 C$$

$$= \begin{bmatrix} \frac{C_s^2}{m_b^2} q_3 & -\frac{C_s^2}{m_b^2} q_3 & \frac{C_s k_s}{m_b^2} q_3 & -\frac{C_s k_s}{m_b^2} q_3 & 0 \\ -\frac{C_s^2}{m_b^2} q_3 & \frac{C_s^2}{m_b^2} q_3 & -\frac{C_s k_s}{m_b^2} q_3 & \frac{C_s k_s}{m_b^2} q_3 & 0 \\ \frac{C_s k_s}{m_b^2} q_3 & -\frac{C_s k_s}{m_b^2} q_3 & q_2 + \frac{k_s^2}{m_b^2} q_3 & -q_2 + \frac{k_s^2}{m_b^2} q_3 & 0 \\ -\frac{C_s k_s}{m_b^2} q_3 & \frac{C_s k_s}{m_b^2} q_3 & -q_2 + \frac{k_s^2}{m_b^2} q_3 & q_1 + q_2 + \frac{k_s^2}{m_b^2} q_3 & -q_1 \\ 0 & 0 & 0 & -q_1 & q_1 \end{bmatrix}$$

-continued $$R = D^T Q_0 D = \frac{q_3}{m_b^2}$$

$$N = C^T Q_0 D$$
$$= D^T Q_0 C$$
$$= \left[ -\frac{C_s}{m_b^2} q_3 \quad \frac{C_s}{m_b^2} q_3 \quad -\frac{k_s}{m_b^2} q_3 \quad \frac{k_s}{m_b^2} q_3 \quad 0 \right]^T$$

It can be concluded that the size of the state variable matrix Q is related to the values of $q_1$, $q_2$ and $q_3$, so the weighting coefficient plays a decisive role in the control effect of the LQG control strategy.

To obtain the optimal control force $F_{act}$ of LQG control strategy, it is required to obtain the feedback state gain matrix K, namely:

$$F_{act} = -KY \tag{9}$$

It can also be expressed as:

$$F_{act} = -(k_1\dot{Z}_b + k_2\dot{Z}_w + k_3 Z_b + k_4 Z_w + k_5 Z_0) \tag{10}$$

According to LQG control theory, gain matrix K can be expressed as:

$$K = R^{-1}(SB+N)^T \tag{11}$$

Wherein, matrix S is the solution of Ricatti equation. The form of Ricatti equation is as follows:

$$(SA)^T + SA - (SB+N)R^{-1}(SB+N)^T + Q = 0 \tag{12}$$

In software Matlab, matrix K, S can be obtained by using LQR function.

$$[K\ S\ E] = lqr(A,B,Q,R,N) \tag{13}$$

Weighting coefficients of LQG control strategy are obtained by genetic algorithm optimization. The optimization objectives of genetic algorithm are vehicle body acceleration and tire dynamic load, which represent vibration isolation of vehicles and tire road holding. The performance parameter of suspension dynamic travel is used as the constraints of the optimization algorithm. The optimized design variable is LQG weighting coefficient:

$$x = (q_1\ q_2\ q_3)^T \tag{14}$$

In the process of optimizing LQG weighting coefficients by genetic algorithm, the fitness function needs to be obtained by calculation through the objective function. The electromagnetic hybrid suspension has three modes when using LQG control strategy: comfort, sport and comprehensive, in which comfort mode requires minimum vehicle body acceleration, sport mode requires minimum tire dynamic load, and comprehensive mode requires both. Therefore, the calculation methods of fitness function are different when genetic algorithm optimization is carried out under three modes.

In comfort mode, the objective function is the RMS value of vehicle body acceleration. Since the root mean square of vehicle body acceleration is required to take the minimum value, while the fitness function should be proportional to the genetic probability, so the fitness function is required to take the maximum value. Therefore, the fitness function is designed as follows:

$$F(x) = \begin{cases} A_P - A_H, & \text{if } A_H < A_P \\ 0, & \text{if } A_H \geq A_P \end{cases} \tag{15}$$

In the formula, $A_P$ is the RMS value of vehicle body acceleration of traditional passive suspension under the same simulation conditions. $A_H$ is the RMS value of vehicle body acceleration of electromagnetic hybrid suspension under LQG control strategy. In the sport mode, the fitness function is designed as follows:

$$F(x) = \begin{cases} T_P - T_H, & \text{if } T_H < T_P \\ 0, & \text{if } T_H \geq T_P \end{cases} \tag{16}$$

In the formula, $T_P$ is the RMS value of tire dynamic load of traditional passive suspension under the same simulation conditions. $T_H$ is the RMS value of tire dynamic load under LQG control strategy of electromagnetic hybrid suspension.

In the comprehensive mode, the objective function is the RMS value of vehicle body acceleration and tire dynamic load, so it belongs to multi-objective genetic algorithm optimization, and the fitness function is designed as follows:

$$F(x) = \frac{A_P}{A_H} + \frac{T_P}{T_H} \tag{17}$$

The specific steps of genetic algorithm to optimize the weighting coefficients of LQG control strategy are as follows:

(1) Parameter initialization: $q_1$, $q_2$ and $q_3$ are encoded by binary system respectively, and then they are connected in series to form a chromosome string to form an individual. When decoding, the binary code is converted to decimal value, then the suspension system is controlled;

(2) Generating population: the initial population with size of M=80 is generated by random method, while the new population is generated by genetic operator operation on the previous generation population;

(3) Fitness function evaluation: the objective functions $A_H$ and $T_H$ of the suspension system controlled by the decoded weighting coefficients are extracted and then transformed into fitness function F(x);

(4) Selection operation: using proportional selection method, assuming that the fitness of the $i^{th}$ individual is F(i), then the genetic probability $p_{si}$ is:

$$p_{si} = F(i) \bigg/ \sum_{i=1}^{M} F(i) \quad i = 1, 2, \cdots, M \tag{18}$$

(5) Cross operation: single point crossover is adopted. Select a single crossover point for each pair of the paired individuals according to the crossover probability $p_c$=0.6 and exchange some of their chromosomes.

(6) Mutation operation: basic bit mutation is used. According to the mutation probability $p_m$=0.001, a part of the gene value in the coding string of an individual chromosome is inversely calculated.

(7) Termination condition judgment: the termination algebra T=300 is set, and the optimal individual in the $300^{th}$ evolutionary algebraic population is output as the optimal solution. If the average fitness difference of 15 successive generations is less than 0.5%, the operation will be terminated ahead of time, and the optimal individual in the current population will be output as the optimal solution.

Figure 7:
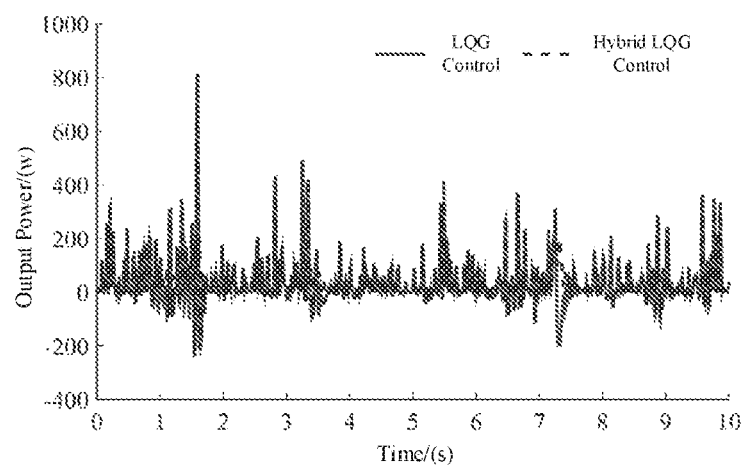
FIG. 7 shows the comparison of time domain simulation of instantaneous power of motor between general active LQG control and hybrid LQG control.
Figure 8:
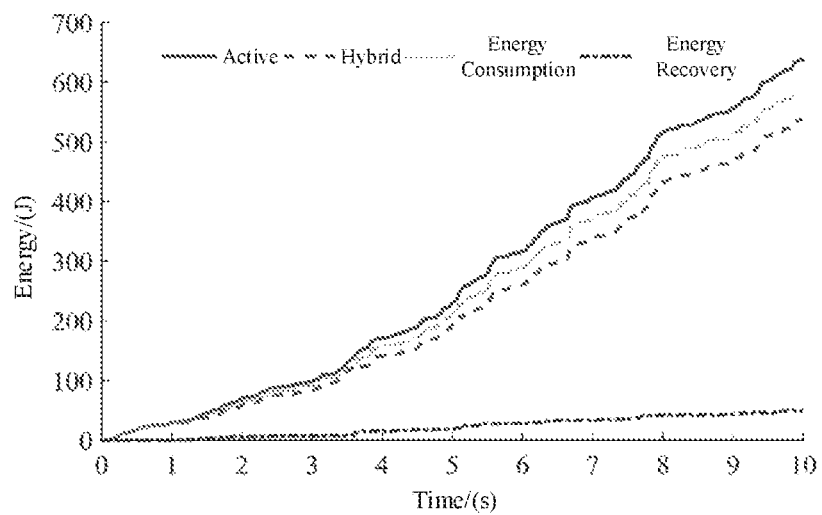
FIG. 8 shows the energy consumption of active suspension and electromagnetic hybrid suspension within 10 seconds.

The advantage of hybrid control method is that the energy consumption is obviously reduced than active control suspension, and the control effect is similar to active suspension. The comparison of time domain simulation of instantaneous power of motor between general active LQG control and hybrid LQG control is shown in FIG. 7. The analysis shows that the instantaneous power of the two motors is the same for most of the time, and all the power in active control is the power consumed by the motor, while the part below line 0 in hybrid control is semi-active control, which is the power recovered by the motor. FIG. 8 shows the energy consumption of the motor in 10 seconds. It can be seen that the energy consumption of hybrid control is reduced by about 20% compared with that of active control.

Figure 9:
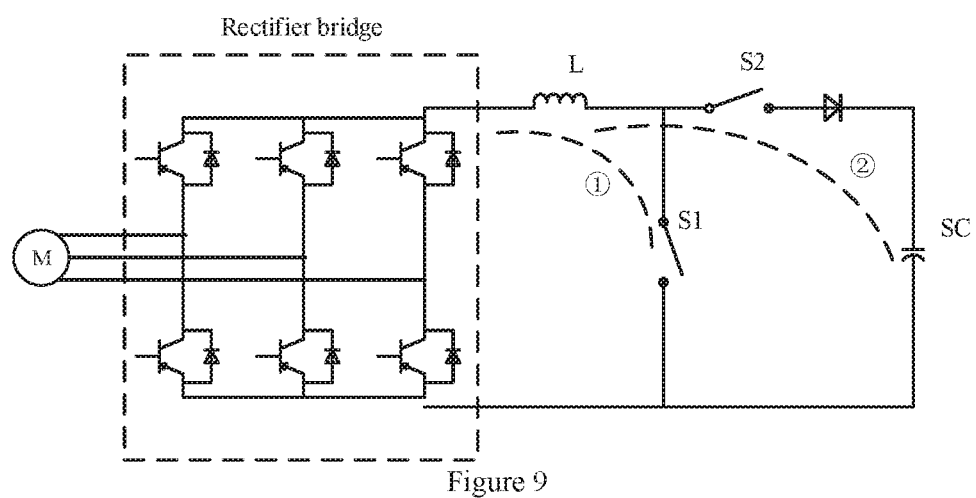
FIG. 9 is a charging circuit diagram of energy feeding mode.

When the electromagnetic hybrid suspension is in the energy-feeding mode, the linear motor is required to recover as much vibration energy as possible. Therefore, the linear motor is used as an electromagnetic damper, and the equivalent damping coefficient is the maximum equivalent damping coefficient $C_{eqmax}$ of the linear motor. The charging circuit of energy recovery in energy-feeding mode is shown in FIG. 9. When the output voltage $U_m$ of linear motor is less than supercapacitor terminal voltage $U_c$, there will be no induction current in the circuit, and there will be dead-zone phenomenon, which will affect the suspension performance. Therefore, at this time, control switch S1 to switch on and S2 to switch off, and the recovered vibration energy is stored in the inductor L. When the output voltage $U_m$ of linear motor is larger than the supercapacitor terminal voltage $U_c$, control S1 to switch off and S2 to switch on, charge the supercapacitor at this time.

It should be understood that the above examples are used only to illustrate the present invention and not to limit the scope of the present invention. After reading the present invention, the modifications of various equivalent forms of the invention by skilled persons in the art fall within the scope of the claims appended to the present application.

We claim:

1. A control method of an electromagnetic hybrid suspension, comprising the following steps:

Step A: providing a quarter electromagnetic hybrid suspension system model, established and expressed by a dynamic differential equation:

$$\begin{cases} \ddot{Z}_b m_b = -k_s(Z_b - Z_w) - C_s(\dot{Z}_b - \dot{Z}_w) + F_{act} \\ \ddot{Z}_w m_w = k_s(Z_b - Z_w) + C_s(\dot{Z}_b - \dot{Z}_w) - k_t(Z_w - Z_0) - F_{act} \end{cases} \quad (1)$$

in the formula, $m_b$ is spring-loaded mass, $m_w$ is non-spring-loaded mass, $k_s$ is spring stiffness, $C_s$ is passive adjustable damper damping coefficient, $k_t$ is tire equivalent stiffness, $Z_0$ is road input displacement, and the mathematical model can be expressed as:

$$\dot{Z}_0(t) = -2pf_0 Z_0(t) + 2p\sqrt{G_0 u} w(t) \quad (2)$$

in the formula, $G_0$ is the road roughness, P is π, u is the vehicle speed, $f_0$ is the lower cut-off frequency, w(t) is the Gauss white noise and the mean value is 0, which is used to generate random road surface;

Step B: dividing the electromagnetic hybrid suspension into four working modes based on the quarter electromagnetic hybrid suspension model: a comfort mode, a sport mode, a comprehensive mode and an energy-feeding mode, each with a main improvement target;

while the electromagnetic hybrid suspension is:

in comfort mode, a Root Mean Square ("RMS") value of vehicle body acceleration is the main improvement target;

in sport mode, a RMS value of tire dynamic load is taken as the main improvement target;

in the comprehensive mode, combined RMS values of the vehicle body acceleration and tire dynamic load are the main improvement target;

in the energy-feeding mode, energy-feeding is maximized while guaranteeing the basic dynamic performance;

Step C: while the electromagnetic hybrid suspension is in comfort mode, sport mode and comprehensive mode, the electromagnetic hybrid suspension comprises two sub-modes: active control mode and semi-active control mode:

in the active control mode, calculating a required control force $F_{des}$ with an Electric Control Unit ("ECU") through a control strategy, then dividing the required control force $F_{des}$ by a thrust coefficient $K_f$ of a linear motor to get a current $I_{des}$ needed by the linear motor, thereafter, the current $I_{des}$ is input to the ECU; wherein an on-board power supply is connected with the ECU, and the ECU is connected with the linear motor; while the current $I_{des}$ is input to the linear motor, the linear motor outputs an active control force $F_{act}$ to the electromagnetic hybrid suspension, at this time, the electric hybrid suspension consumes energy;

in the semi-active control mode, calculating the required control force $F_{des}$ with the ECU through a control strategy, then dividing the required control force $F_{des}$ by a thrust coefficient $K_f$ of the linear motor to get the current $I_{des}$ needed by the linear motor, thereafter, the current $I_{des}$ is input to the ECU; the ECU is connected with the semi-active control loop, the duty cycle is input to the ECU to adjust the current $I_{des}$ in the ECU, thereby adjusting the equivalent damping coefficient $C_{eq}$ of the linear motor; a semi-active control loop is connected with the linear motor; the linear motor outputs an electromagnetic damping force to the electromagnetic hybrid suspension system; the linear motor is used as an electromagnetic damper generator, and electric energy recovered by the linear motor acting as a generator is stored in a plurality of super capacitors; introducing parameters:

$$C_{act} = -\frac{F_{des}}{v_{rel}} \quad (3)$$

in the formula, $F_{des}$ represents the required control force to be provided by the linear motor and calculated by the control strategy; comparing $C_{act}$ with a maximum equivalent damping coefficient $C_{eqmax}$ of the linear motor, if $0 < Cact < Ce_{eqmax}$, the required control force $F_{des}$ is in semi-active control mode, and if $C_{act} > C_{eqmax}$, the required control force $F_{des}$ is other cases-are in active control mode;

Step D: causing the linear motor to act as a generator while the electromagnetic hybrid suspension is in the energy-feeding mode, which is equivalent to a nonadjustable electromagnetic damper acting in the electromagnetic hybrid suspension, and the electromagnetic damping coefficient is a maximum equivalent electromagnetic damping coefficient $C_{eqmax}$ to ensure that as much electric energy as possible can be recovered, the electric energy is stored in the plurality of super capacitors.

2. The control method of electromagnetic hybrid suspension according to claim 1, wherein the control force $F_{des}$ in step C is calculated from a Linear Quadratic Gaussian ("LQG") control strategy;

changing the selection of LQG weighting coefficients corresponds to the comfort mode, sport mode and comprehensive mode respectively;

a LQG performance index function is designed as follows:

$$J = \lim_{T \to \infty} \frac{1}{T} \int_0^T \left[ q_1(Z_w - Z_0)^2 + q_2(Z_b - Z_w)^2 + q_3 \ddot{Z}_b^2 \right] dt \quad (4)$$

in the formula, $Z_w$-$Z_0$ is the dynamic displacement of the tire, wherein multiplying $Z_w$-$Z_0$ by an equivalent stiffness $k_t$ of the tire is the dynamic load of the tire; $Z_b$-$Z_w$ is the suspension dynamic travel; $\ddot{Z}_b$ is the acceleration of the vehicle body; $q_1$, $q_2$ and $q_3$ represent the weighting coefficients of tire dynamic load, suspension dynamic travel and vehicle body acceleration, respectively.

3. The control method of electromagnetic hybrid suspension according to claim 2, wherein, a specific process of $F_{des}$ calculation by the LQG control strategy is as follows:

a state space equation of electromagnetic hybrid suspension is as follows:

$$\dot{X} = AX + BU \quad (5)$$

in the formula, selecting $X = [\dot{Z}_b \; \dot{Z}_w \; Z_b \; Z_w \; Z_0]^T$ as the state variable, $U = [F_{act}]$ as the input control variable, the following can be obtained:

$$A = \begin{bmatrix} -\frac{C_s}{m_b} & \frac{C_s}{m_b} & -\frac{k_s}{m_b} & \frac{k_s}{m_b} & 0 \\ \frac{C_s}{m_w} & -\frac{C_s}{m_w} & \frac{k_s}{m_w} & -\frac{k_s + k_t}{m_w} & \frac{k_t}{m_w} \\ 1 & 0 & 0 & 0 & 0 \\ 0 & 1 & 0 & 0 & 0 \end{bmatrix}$$

$$B = \begin{bmatrix} \frac{1}{m_b} & -\frac{1}{m_w} & 0 & 0 \end{bmatrix}^T$$

selecting $Y = [Z_w - Z_0 \; Z_b - Z_w \; \ddot{Z}_b]^T$ as the output control variable, the output equation is as follows:

$$Y = CX + DU \quad (6)$$

$$C = \begin{bmatrix} 0 & 0 & 0 & 1 & -1 \\ 0 & 0 & 1 & -1 & 0 \\ -\frac{C_s}{m_b} & \frac{C_s}{m_b} & -\frac{k_s}{m_b} & \frac{k_s}{m_b} & 0 \end{bmatrix}$$

$$D = \begin{bmatrix} 0 & 0 & \frac{1}{m_b} \end{bmatrix}^T$$

for the LQG control strategy, the objective is to find the input control variable $U = [F_{act}]$ so that a performance index function takes the minimum value; the input control variable U belongs to one of the quadratic optimal control problems, so the performance index function is written in the standard quadratic form as follows:

$$J = \lim_{T \to \infty} \frac{1}{T} \int_0^T \left( X^T Q X + U^T R U + 2 X^T N U \right) dt \quad (7)$$

the performance index can be obtained from formula (4) and formula (6):

$$J = \lim_{T \to \infty} \frac{1}{T} \int_0^T Y^T Q_0 Y \, dt \quad (8)$$

in the formula, $Q_0$ is a LQG weighting coefficient matrix, which is expressed as follows:

$$Q_0 = \begin{bmatrix} q_1 & 0 & 0 \\ 0 & q_2 & 0 \\ 0 & 0 & q_3 \end{bmatrix}$$

therefore, the weighting matrix Q of the state variable, the weighting matrix R of the control variable and the weighting matrix N of the crossover term can be obtained:

$$Q = C^T Q_0 C$$

$$= \begin{bmatrix} \frac{C_s^2}{m_b^2} q_3 & -\frac{C_s^2}{m_b^2} q_3 & \frac{C_s k_s}{m_b^2} q_3 & -\frac{C_s k_s}{m_b^2} q_3 & 0 \\ -\frac{C_s^2}{m_b^2} q_3 & \frac{C_s^2}{m_b^2} q_3 & -\frac{C_s k_s}{m_b^2} q_3 & \frac{C_s k_s}{m_b^2} q_3 & 0 \\ \frac{C_s k_s}{m_b^2} q_3 & -\frac{C_s k_s}{m_b^2} q_3 & q_2 + \frac{k_s^2}{m_b^2} q_3 & -q_2 - \frac{k_s^2}{m_b^2} q_3 & 0 \\ -\frac{C_s k_s}{m_b^2} q_3 & \frac{C_s k_s}{m_b^2} q_3 & -q_2 - \frac{k_s^2}{m_b^2} q_3 & q_1 + q_2 + \frac{k_s^2}{m_b^2} q_3 & -q_1 \\ 0 & 0 & 0 & -q_1 & q_1 \end{bmatrix}$$

$$R = D^T Q_0 D = \frac{q_3}{m_b^2}$$

$$N = C^T Q_0 D$$

$$D^T Q_0 C$$

$$= \begin{bmatrix} -\frac{C_s}{m_b^2} q_3 & \frac{C_s}{m_b^2} q_3 & -\frac{k_s}{m_b^2} q_3 & \frac{k_s}{m_b^2} q_3 & 0 \end{bmatrix}^T$$

the size of the state variable matrix Q is related to the values of $q_1$, $q_2$ and $q_3$, so the weighting coefficient plays a decisive role in the control effect of the LQG control strategy;

to obtain an optimal control force $F_{act}$ of the LQG control strategy, the feedback state gain matrix K is first obtained, namely:

$$F_{act} = -KY \quad (9)$$

the optimal control force $F_{act}$ can also be expressed as:

$$F_{act} = -(k_1 \dot{Z}_b + k_2 \dot{Z}_w + k_3 Z_b + k_4 Z_w + k_5 Z_0) \quad (10)$$

according to LQG control theory, gain matrix K can be expressed as:

$$K = R^{-1}(SB + N)^T \quad (11)$$

matrix S is the solution of Ricatti equation, the form of Ricatti equation is as follows:

$$(SA)^T + SA - (SB + N)R^{-1}(SB + N)^T + Q = 0 \quad (12)$$

from matrix K, S can be obtained by using LQR function:

$$[K\ S\ E]=lqr(A,B,Q,R,N) \qquad (13).$$

4. The control method of electromagnetic hybrid suspension according to claim 3, wherein, three state variables of vehicle body acceleration, tire dynamic load and suspension dynamic travel are collected and input into a LQG controller; wherein different mixing modes have different combinations of the LQG weighting coefficients, the LQG controller calculates $F_{des}$ based on the three state variables and the LQG weighting coefficients.

5. The control method of electromagnetic hybrid suspension according to claim 2, wherein, the weighting coefficients of the LQG control strategy are obtained by a genetic algorithm optimization, an optimization objective of the genetic algorithm optimization are a vehicle body acceleration and a tire dynamic load, which represent a vibration isolation of vehicle and a tire road holding, respectively; a performance parameter of suspension dynamic travel is used as a constraint of the optimization algorithm; the optimized design variable is a LQG weighting coefficient:

$$x=(q_1\ q_2\ q_3)^T \qquad (14)$$

in the process of optimizing the LQG weighting coefficients by the genetic algorithm optimization, a fitness function needs to be calculated by the objective function; the electromagnetic hybrid suspension has three modes while using the LQG control strategy: comfort, sport and comprehensive, in which comfort mode requires a minimum vehicle body acceleration, sport mode requires a minimum tire dynamic load, and comprehensive mode requires both the minimum vehicle body acceleration and the minimum tire dynamic load; therefore, the calculation methods of the fitness function are different when the genetic algorithm optimization is carried out under three modes;

in comfort mode, the objective function is the RMS value of vehicle body acceleration; since the root mean square of a vehicle body acceleration is required to take the minimum value, the fitness function should be proportional to a genetic probability, so the fitness function is required to take the maximum value, therefore, the fitness function is designed as follows:

$$F(x) = \begin{cases} A_P - A_H, & \text{if } A_H < A_P \\ 0, & \text{if } A_H \geq A_P \end{cases} \qquad (15)$$

in the formula, $A_P$ is the RMS value of vehicle body acceleration of traditional passive suspension under the same simulation conditions, $A_H$ is the RMS value of vehicle body acceleration of the electromagnetic hybrid suspension under the LQG control strategy;

in the sport mode, the fitness function is designed as follows:

$$F(x) = \begin{cases} T_P - T_H, & \text{if } T_H < T_P \\ 0, & \text{if } T_H \geq T_P \end{cases} \qquad (16)$$

in the formula, $T_P$ is the RMS value of a tire dynamic load of a traditional passive suspension under the same simulation conditions, TH is the RMS value of the tire dynamic load of electromagnetic hybrid suspension under the LQG control strategy;

in the comprehensive mode, an objective function is the RMS value of a vehicle body acceleration and a tire dynamic load, so the objective function belongs to a multi-objective genetic algorithm optimization, and the fitness function is designed as follows:

$$F(x) = \frac{A_P}{A_H} + \frac{T_P}{T_H}. \qquad (17)$$

6. The control method of electromagnetic hybrid suspension according to claim 5, wherein, the specific steps of genetic algorithm to optimize the weighting coefficients of the LQG control strategy are as follows:

(1) parameter initialization: $q_1$, $q_2$ and $q_3$ are encoded by a binary system respectively, and then they are connected in series to form a chromosome string to form an individual; while decoding, the binary code is converted to a decimal value, then the electromagnetic hybrid suspension system is controlled;

(2) generating population: an initial population with size of M=80 is generated by a random method, while a new population is generated by a genetic operator operation on the previous generation population;

(3) fitness function evaluation: objective functions $A_H$ and $T_H$ of the electromagnetic suspension system controlled by a decoded weighting coefficients are extracted and then transformed into a fitness function F(x);

(4) selection operation: using proportional selection method, assuming that the fitness of the $i^{th}$ individual is F(i), then a genetic probability $p_{si}$ is:

$$P_{si} = F(i)/\sum_{i=1}^{M} F(i) \quad i = 1, 2, \ldots, M \qquad (18)$$

(5) cross operation: single point crossover is adopted; select a single crossover point for each pair of the paired individuals according to a crossover probability $p_c$=0.6 and an exchange some of their chromosomes;

(6) mutation operation: a basic bit mutation is used; according to the mutation probability $p_m$=0.001, a part of a gene value in the coding string of an individual chromosome is inversely calculated;

(7) termination condition judgment: a termination algebra T=300 is set, and an optimal individual in a $300^{th}$ evolutionary algebraic population is output as an optimal solution; if an average fitness difference of 15 successive generations is less than 0.5%, the operation will be terminated ahead of time, and the optimal individual in a current population will be output as the optimal solution.

7. The control method of electromagnetic hybrid suspension according to claim 1, wherein, the electromagnetic hybrid suspension switching between the active control mode and the semi-active control mode in step C is realized by a first switching device comprising an insulated-gate bipolar transistor ("IGBT"): the on-board power supply is connected with an inverter, and a first end of the inverter is connected with a second switching device; a second end of the second switching device is connected with a third switching device and the linear motor; the third switching device is connected with a rectifier bridge and a DC/DC converter; the output of the DC/DC converter is connected with a positive end of a diode and a negative end of the diode is connected with the super capacitor.

8. The control method of electromagnetic hybrid suspension according to claim 1, wherein, the electromagnetic hybrid suspension used in the energy-feeding mode in step D is as follows: the linear motor is connected with a rectifier bridge, and a first end of the rectifier bridge is connected with a first end of the inductance; a second end of the inductance is connected with a first of a switch and a first end of the switch respectively; a second end of the switch is connected with a positive end of a diode, and a negative end of the diode is connected with a first end of the super capacitor; a second end of the super capacitor is connected with a second end of the switch and a second end of the rectifier bridge respectively.

9. The control method of electromagnetic hybrid suspension according to claim 1, wherein, the adjustable dampers in the comfort mode, sport mode, comprehensive mode and energy-feeding mode correspond to four different gears respectively.

* * * * *